United States Patent [19]

Furukawa et al.

[11] Patent Number: 5,747,625
[45] Date of Patent: May 5, 1998

[54] SILICATE GROUP-CONTAINING POLYIMIDE

[75] Inventors: Nobuyuki Furukawa; Takeshi Fujiyama; Masatoshi Yuasa, all of Kitakyushu, Japan

[73] Assignee: Nippon Steel Chemical Co., Ltd., Tokyo, Japan

[21] Appl. No.: 750,322

[22] PCT Filed: May 30, 1995

[86] PCT No.: PCT/JP95/01039

§ 371 Date: Nov. 26, 1996

§ 102(e) Date: Nov. 26, 1996

[87] PCT Pub. No.: WO95/33000

PCT Pub. Date: Jul. 12, 1995

[30] Foreign Application Priority Data

May 31, 1994 [JP] Japan ..................... 6-140840

[51] Int. Cl.$^6$ ..................................... C08G 77/26
[52] U.S. Cl. .......................... 528/26; 528/38; 528/35; 556/425; 556/434; 525/431; 525/478
[58] Field of Search .................. 578/38, 26, 35; 556/425, 434; 525/431, 478

[56] References Cited

U.S. PATENT DOCUMENTS

| | | | |
|---|---|---|---|
| 3,288,754 | 11/1966 | Green | 556/425 |
| 4,634,610 | 1/1987 | Keohan et al. | 427/387 |
| 5,118,777 | 6/1992 | Okawa | 528/34 |
| 5,304,627 | 4/1994 | Connell et al. | 528/353 |
| 5,473,041 | 12/1995 | Itoh | 528/26 |

FOREIGN PATENT DOCUMENTS

| | | |
|---|---|---|
| 1-204931 | 8/1989 | Japan . |
| 3-177472 | 8/1991 | Japan . |
| 3-259980 | 11/1991 | Japan . |
| 4-36321 | 2/1992 | Japan . |
| 5-112760 | 5/1993 | Japan . |

OTHER PUBLICATIONS

Mat. Res. Soc. Symp. Proc., 175, 179–186 (1990).

Primary Examiner—Margaret W. Glass
Attorney, Agent, or Firm—Darby & Darby

[57] ABSTRACT

The present invention provides a novel silicate group-containing polyimide which is excellent in mechanical properties, heat resistance and electrical properties and has an excellent film forming ability. Further, the present invention provides a film-formable heat resistant material having an excellent solvent resistance, elasticity and adhesive property. The silicate group-containing polyimide has a repeated unit represented by the following Formula (1):

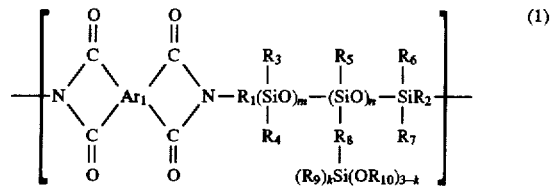

wherein $Ar_1$ represents a tetravalent organic group; $R_1$ and $R_2$ each are a single bond or represent an alkylene group having 1 to 4 carbon atoms or a phenylene group; $R_3$ to $R_7$, $R_9$ and $R_{10}$ each represent a hydrocarbon group having 1 to 6 carbon atoms; $R_8$ represents an ethylene group or an alkylene group having 3 to 6 carbon atoms; m and n represent independently an integer of 1 to 10; and k represents an integer of 0 to 2. The silicate group-containing polyimide described above is produced from a tetracarboxylic anhydride and a diamine component having at least one alkylsilicate group as a substituent for a side chain.

3 Claims, 2 Drawing Sheets

SILICATE GROUP-CONTAINING POLYIMIDE

TECHNICAL FIELD

The present invention relates to a polyimide resin, specifically to a polyimide resin having alkylsilicate on a polymer side chain.

BACKGROUND ART

Polyimide type resins are excellent in a heat resistance, electrical properties and mechanical properties and widely used for films, coating agents and molding materials. In recent years, polyimide resins have been investigated to apply to adhesive materials by making use of flexibility thereof (Japanese Patent Application Laid-Open No. Hei 3-177472). However, all of them are linear type thermoplastic polyimide resins and have had the defects that they have extremely low strengths at temperatures higher than the glass transition points and inferior solvent resistance. In order to improve this, it has been investigated to copolymerize a soft segment such as diaminosiloxane (Japanese Patent Application Laid-Open No. Hei 4-3632 and Japanese Patent Application Laid-Open No. Hei 5-112760). Further, a thermosetting type polyimide having a cross-linkable group at a terminal has been developed (Japanese Patent Application Laid-Open No. Hei 3-259980). However, they are an oligomer having a low molecular weight, so that they have had the defects that film formation is difficult and the use is restricted to varnish and that a high curing temperature is required.

DISCLOSURE OF THE INVENTION

The present invention provides a novel silicate group-containing polyimide which overcomes the preceding defects of conventional techniques and is excellent in mechanical properties, heat resistance and electrical properties and which has an excellent film forming ability. Further, the present invention provides a film-formable heat resistant material having an excellent solvent resistance, elasticity and adhesive property.

That is, the present invention relates to a silicate group-containing polyimide having a repeated unit represented by the following Formula (1):

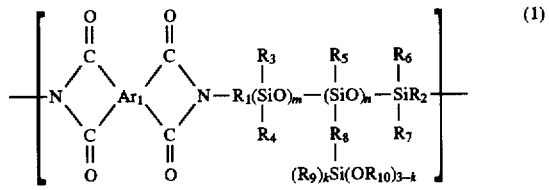

wherein $Ar_1$ represents a tetravalent organic group; $R_1$ and $R_2$ each are a single bond or represent an alkylene group having 1 to 4 carbon atoms or a phenylene group; $R_3$ to $R_7$, $R_9$ and $R_{10}$ each represent a hydrocarbon group having 1 to 6 carbon atoms; $R_8$ represents an ethylene group or an alkylene group having 3 to 6 carbon atoms; m and n represent independently an integer of 1 to 10; and k represents an integer of 0 to 2.

Further, the present invention relates to a silicate group-containing polyimide comprising 1 to 80 mole % of the repeated unit represented by Formula (1) and 20 to 99 mole % of a repeated unit represented by the following Formula (2):

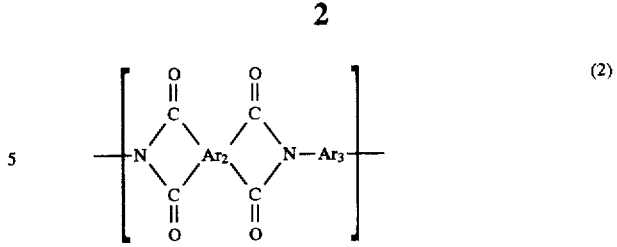

wherein $Ar_2$ represents a tetravalent organic group, and $Ar_3$ represents a divalent organic group having at least 3 aromatic rings.

The repeated unit represented by Formula (1) described above is composed of tetracarboxylic anhydride and diamine. In the formula, $Ar_1$ is a tetravalent organic group constituting tetracarboxylic anhydride which is the raw material, and specific examples of such tetracarboxylic anhydride include tetracarboxylic dianhydride having at least two aromatic rings, such as 3,3',4,4'-diphenyltetracarboxylic dianhydride, 3,3',4,4'-benzophenonetetracarboxylic dianhydride, 3,3',4,4'-diphenyl ether tetracarboxylic dianhydride, 3,3',4,4'-diphenyl sulfone tetracarboxylic dianhydride, 2,2-bis(3,3',4,4'-tetracarboxyphenyl) hexafluoropropane dianhydride, 2,3,3',4'-biphenyltetracarboxylic dianhydride, 2,3,3',4'-benzophenonetetracarboxylic dianhydride, 2,3,3',4'-diphenyl ether tetracarboxylic dianhydride, 2,3,3',4'-diphenyl sulfone tetracarboxylic dianhydride, 2,2-bis(3,4-dicarboxyphenoxyphenyl) propane dianhydride and 2,2'-bis(3,4-dicarboxyphenoxyphenyl)sulfone dianhydride. There can be used as well, tetracarboxylic anhydrides such as pyromellitic anhydride, 1,4,5,8-naphthalenetetracarboxylic anhydride and 2,3,6,7-naphthalenetetracarboxylic anhydride.

Further, specific examples of the diamine component used in the present invention for constituting the repeated unit represented by Formula (1) include:

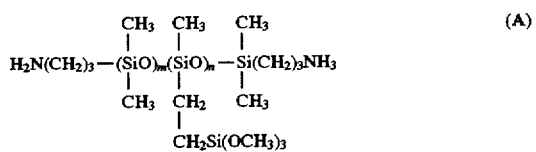

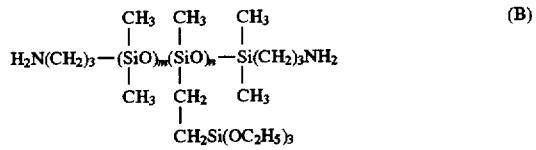

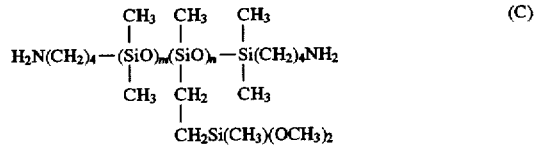

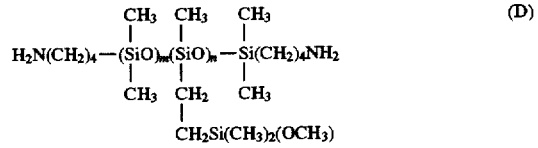

-continued

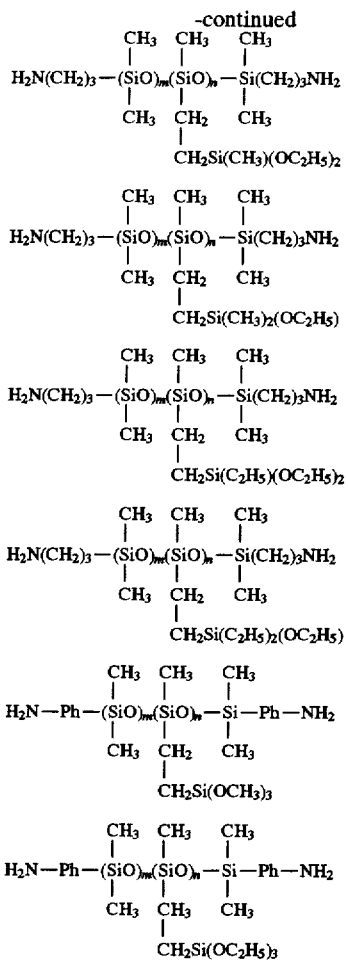

wherein Ph represents a phenylene group, and m and n represent independently an integer of 1 to 10.

Any amine can be used without being restricted to the diamines described above as long as it has at least one alkylsilicate group as a substituent for a side chain. Further, they can be used alone or in combination of two or more kinds thereof.

Further, the repeated unit represented by Formula (1) described above can be produced as well by using vinyl group-containing diaminosiloxane represented by the following Formula (4) and tetracarboxylic anhydride:

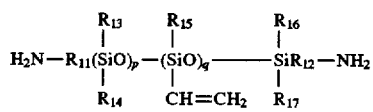

wherein $R_{11}$ and $R_{12}$ each are a single bond or represent an alkylene group having 1 to 4 carbon atoms or a phenylene group; $R_{13}$ to $R_{17}$ each represent a hydrocarbon group having 1 to 6 carbon atoms; and p and q represent independently an integer of 1 to 10.

to prepare a repeated unit represented by the following Formula (5):

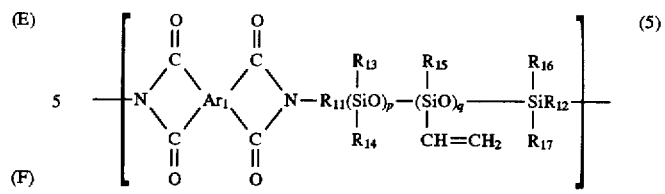

wherein $Ar_1$ represents a tetravalent organic group; $R_{11}$ and $R_{12}$ each are a single bond or represent an alkylene group having 1 to 4 carbon atoms or a phenylene group; $R_{13}$ to $R_{17}$ each represent a hydrocarbon group having 1 to 6 carbon atoms; and p and q represent independently an integer of 1 to 10, and then subjecting the above repeated unit to hydrosilylation with a compound represented by the following Formula (6):

wherein $R_{21}$ and $R_{22}$ each represent a hydrocarbon group having 1 to 6 carbon atoms, and x represents an integer of 0 to 2.

Specific examples of the vinyl group-containing diaminosiloxane represented by Formula (4) described above include:

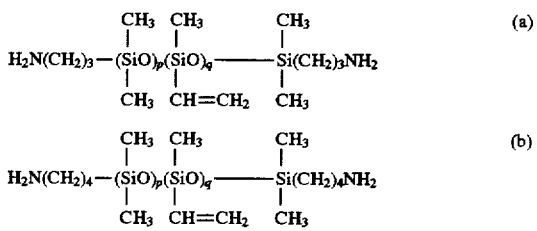

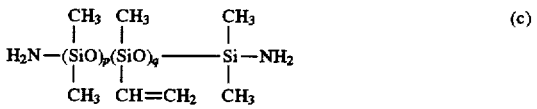

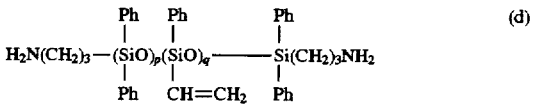

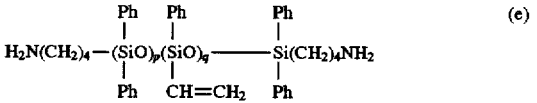

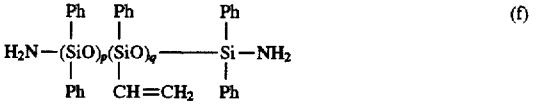

wherein Ph represents a phenyl group, and p and q represent independently an integer of 1 to 10.

However, any compound can be used without being restricted to these compounds as long as it has at least one vinyl group as a substituent for a side chain.

Specific examples of the hydroalkylsilicate compound represented by Formula (6) described above include:

| | |
|---|---|
| (1) $HSi(OCH_3)_3$ | (2) $HSi(OC_2H_5)_3$ |
| (3) $HSi(CH_3)(OCH_3)_2$ | (4) $HSi(CH_3)(OC_2H_5)_2$ |

|  |  |
|---|---|
| (5) $HSi(CH_3)_2(OCH_3)$ | (6) $HSi(CH_3)_2(OC_2H_5)$ |
| (7) $HSi(C_2H_5)(OCH_3)_2$ | (8) $HSi(C_2H_5)_2(OCH_3)$ |
| (9) $HSi(C_2H_5)(OC_2H_5)_2$ | (10) $HSi(C_2H_5)_2(OC_2H_5)$ |
| (11) $HSi(OCH_2CH_2OCH_3)_3$ | (12) $HSi(OCH_2CH_2OC_2H_5)_3$ |

However, any compound can be used without being restricted to these compounds as long as it has a hydroalkylsilicate group.

Further, in reacting these hydroxyalkylsilicates with the vinyl group-containing polymer represented by Formula (5) described above to constitute the repeated unit represented by Formula (1) described above, chloroplatinic acid can be used as a catalyst.

In reacting these hydroxyalkylsilicate compounds with the vinyl group contained in the repeated unit represented by Formula (5) described above, the hydroxyalkylsilicate compounds are used preferably in a range of 1.0 to 5.0 mole equivalent per equivalent of the vinyl group.

The diamine component used for constituting the repeated unit represented by Formula (2) described above includes 4,4'-diaminodiphenyl ether, 4,4'-diaminodiphenyl sulfone, 4,4'-diaminodiphenyl sulfide, 2,2-bis(4-aminophenoxyphenyl)propane, bis[4-(4-aminophenoxy)phenyl]sulfone, bis[4-(3-aminophenoxy)phenyl]sulfone, 4,4'-bis(4-aminophenoxy)diphenyl, 1,4-bis(4-aminophenoxy)benzene, 2,2-bis(4-aminophenoxyphenyl)hexafluoropropane, 1,4-diaminobenzene, and 2,5-diaminotoluene. The diamino compounds having at least 3 aromatic rings are preferably used.

Further, there can be used as well, the diamino compounds having a hydroxyl group and a carboxyl group, triamines, and tetraamines such as:

(a) 4-(3-hydroxyphenoxycarbonyl)-1,3-diaminobenzene,
(b) 4-(2-hydroxyphenoxycarbonyl)-1,3-diaminobenzene,
(c) 4-(4-hydroxyphenoxycarbonyl)-1,3-diaminobenzene,
(d) 5-(2-hydroxyphenoxycarbonyl)-1,3-diaminobenzene,
(e) 5-(3-hydroxyphenoxycarbonyl)-1,3-diaminobenzene,
(f) 5-(4-hydroxyphenoxycarbonyl)-1,3-diaminobenzene,
(g) 4-(2-aminophenoxy)-1,3-diaminobenzene,
(h) 4-(3-aminophenoxy)-1,3-diaminobenzene,
(i) 4-(4-aminophenoxy)-1,3-diaminobenzene,
(j) 5-(2-aminophenoxy)-1,3-diaminobenzene,
(k) 5-(3-aminophenoxy)-1,3-diaminobenzene,
(l) 5-(4-aminophenoxy)-1,3-diaminobenzene,
(m) 4-(3,5-aminophenoxy)-1,3-diaminobenzene, and
(n) 4-(2-aminophenoxycarbonyl)-1,3-diaminobenzene.

The polyimide thus synthesized, represented by Formula (1) described above, contains a silicate group on a side chain and therefore has an excellent adhesive property. Further, it can constitute a cross-linking structure by hydrolysis or heating hydrolysis and therefore becomes a material having excellent heat resistance, strength and solvent resistance.

BEST MODE FOR CARRYING OUT THE INVENTION

The present invention shall be explained below in further detail with reference to examples. Abbreviations used in the present examples represent the following compounds, and signs parenthesized in the table represent the compounds described in the specification.

Abbreviations of the compounds:

EDTA: 3,3',4,4'-benzophenonetetracarboxylic dianhydride

ODPA: 3,3',4,4'-diphenyl ether tetracarboxylic dianhydride

DSDA: 3,3',4,4'-diphenyl sulfone tetracarboxylic dianhydride

PMDA: pyromellitic dianhydride

BAPP: 2,2-bis[4-(4-aminophenoxy)phenyl]propane

BAPS: bis[4-(4-aminophenoxy)phenyl]sulfone

BAPS-M: bis[4-(3-aminophenoxy)phenyl]sulfone

BAPB: 4,4'-bis(4-aminophenoxy)diphenyl

NMP: N-methyl-2-pyrrolidone

DMAc: N,N-dimethylacetamide

PSX6: diaminopolydimethylsiloxane compound having an average molecular weight of 800

PSX7: diaminopolydimethylsiloxane compound having an average molecular weight of 1200

SYNTHETIC EXAMPLE 1

BAPP of 37.0 g (0.09 mole) and 8.5 g (0.01 mole) of the diamino compound (a) having a cross-linkable functional group were added to 150 ml of dry NMP to be dissolved. Then, 31.1 g (0.10 mole) of ODPA was added little by little while maintaining the temperature of the solution at 30° C. or lower to carry out polymerization for about 5 hours while stirring, and thus a polyamic acid solution was obtained. m-Xylene of 50 g was added to the polyamic acid solution thus synthesized in a Dean-Shyutark type reactor, and the solution was heated to 180° C. to carry out solution imidation. After finishing the reaction, the solution was cooled down to room temperature, and then hydrotriethoxysilane (0.12 mole) was added little by little thereto. After adding the whole amount, 0.01 g of chloroplatinic acid ($H_2PtCl_6 \cdot H_2O$) was added as a hydrosilylation catalyst to carry out the reaction for 5 hours. After finishing the reaction, the solution was cooled down to room temperature. A part of the resin solution was cast on a glass plate and dried at 100° C. (one hour). Then, a film was peeled off from the glass plate and fixed on a metal frame, followed by heating at 150° C. (30 minutes) and 200° C. (10 minutes) to prepare a polyimide film.

EXAMPLE 1

Figure 1:
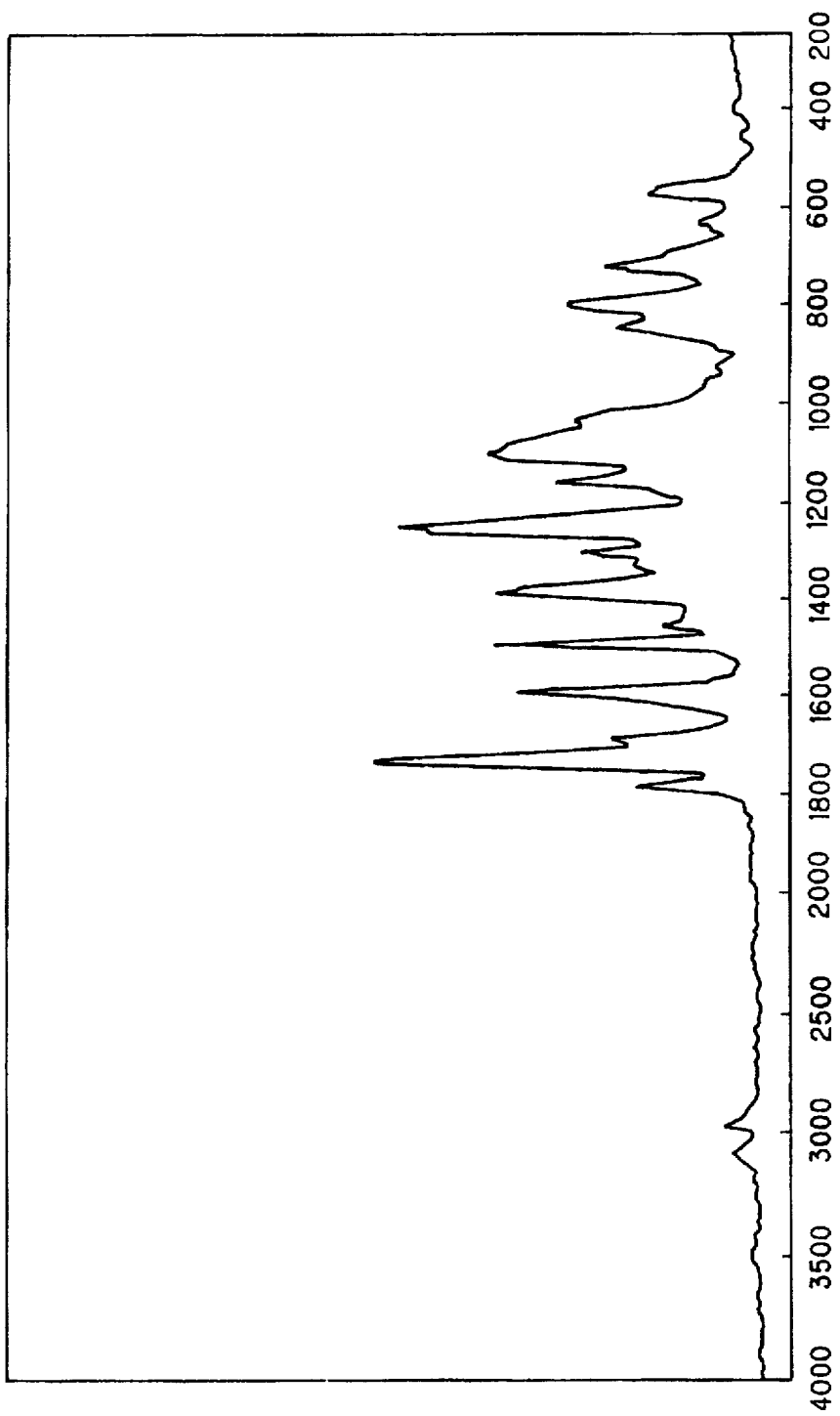
FIG. 1 is an infrared absorption spectrum of the silicate group-containing polyimide obtained in Example 1.
Figure 2:
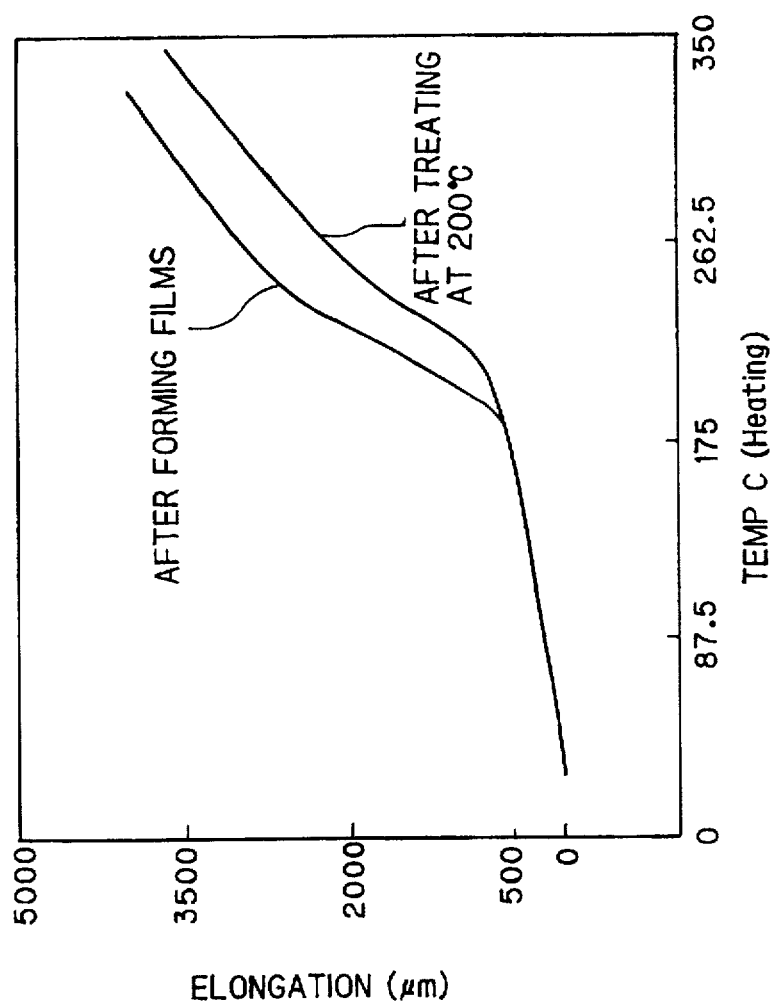
FIG. 2 is a thermal mechanical analysis (TMA) chart of the silicate group-containing polyimide obtained in Example 2.

BTDA of 32.2 g, BAPP of 37.0 g and diaminosiloxane (A) of 8.5 g were used as the raw materials to synthesize silicate group-containing polyimide by the method used in Synthetic Example 1. Shown are an infrared spectrum thereof in FIG. 1 and a TMA characteristic in FIG. 2. Further, the polyimide was subjected to heat treatment at 200° C. (one hour) to determine the resin characteristics after curing. The results thereof are shown in Table 1.

EXAMPLES 2 to 12

The method used in Synthetic Example 1 was used to carry out the polymerizations. The polymerization monomer compositions and the polymerization results thereof are shown in Table 1.

Further, the polyimide films were prepared and then measured for fundamental physical properties. The results thereof are shown together in Table 1.

COMPARATIVE EXAMPLES 1 to 4

The resins were synthesized in the same manner as in Synthetic Example 1, except that diaminosiloxanes having no alkylsilicate groups were used. The compositions and the fundamental physical properties are shown in Table 1. The films were prepared from these resins at 150° C. (30 minutes) and 200° C. (10 minutes) to determine the physical properties. Further, the physical properties were measured again after treating the films at 200° C. (one hour) but little change was found.

TABLE 1

| | Examples | | | | | | | |
|---|---|---|---|---|---|---|---|---|
| | 1 | 2 | 3 | 4 | 5 | 6 | 7 | 8 |
| [Resin raw materials] | | | | | | | | |
| Carboxylic anhydride (mole %) | BTDA 100 | DSDA 100 | BTDA 100 | ODPA 100 | BTDA 90 PMDA 10 | DSDA 50 BTDA 50 | BTDA 100 | DSDA 100 |
| Diamine compound (mole %) | BAPP 90 (A) 10 | BAPS-M 90 (B) 10 | BAPP 80 (C) 20 | BAPB 80 (D) 20 | BAPS 70 (E) 30 | BAPS-M 70 (a) 30 | BAPS-M 80 (b) 20 | BAPS-M 90 (a) 10 |
| Hydroalkoxysilane compound (mole %)[1] | — | — | — | — | — | (1) 2 | (2) 2 | (3) 2 |
| Solvent | NMP | NMP | NMP | NMP | NMP | NMP | NMP | DMAC |
| viscosity (cps) | 5,000 | 7,000 | 4,000 | 5,500 | 3,500 | 4,500 | 4,000 | 5,000 |
| [Characteristics before curing[4]] | | | | | | | | |
| Elastic modulus[2] (kg/mm$^2$) | 240 | 255 | 220 | 215 | 200 | 195 | 215 | 225 |
| Strength[2] (kg/mm$^2$) | 18.4 | 17.5 | 17.2 | 15.8 | 14.1 | 12.8 | 17.2 | 19.0 |
| Elongation[2] (%) | 20.2 | 15.1 | 10.6 | 22.3 | 34.0 | 31.5 | 18.0 | 15.4 |
| Glass transition[3] temperature (°C.) | 210 | 203 | 192 | 205 | 182 | 167 | 182 | 198 |
| [Chemical resistance[5]] | | | | | | | | |
| Chloroform | ○ | ○ | ○ | ○ | ○ | ○ | ○ | ○ |
| Dichloromethane | ○ | ○ | ○ | ○ | ○ | ○ | ○ | ○ |
| Trichlene | ○ | ○ | ○ | ○ | ○ | ○ | ○ | ○ |
| Acetone | ○ | ○ | ○ | ○ | ○ | ○ | ○ | ○ |
| Methanol | ○ | ○ | ○ | ○ | ○ | ○ | ○ | ○ |
| DMF | ○ | ○ | ○ | ○ | Δ | Δ | ○ | ○ |
| NMP | ○ | ○ | ○ | ○ | Δ | Δ | Δ | ○ |
| [Characteristics after curing[6]] | | | | | | | | |
| Elastic modulus (kg/mm$^2$) | 252 | 267 | 235 | 225 | 220 | 206 | 223 | 234 |
| Strength[2] (kg/mm$^2$) | 20.3 | 19.2 | 19.0 | 18.1 | 16.3 | 14.0 | 19.0 | 21.1 |
| Elongation[2] (%) | 19.0 | 14.3 | 9.6 | 20.5 | 27.2 | 27.2 | 15.3 | 10.2 |
| Glass transition[3] temperature (°C.) | 217 | 212 | 208 | 220 | 195 | 180 | 195 | 211 |

| | Examples | | | | Comparative Examples | | | |
|---|---|---|---|---|---|---|---|---|
| | 9 | 10 | 11 | 12 | 1 | 2 | 3 | 4 |
| [Resin raw materials] | | | | | | | | |
| Carboxylic anhydride (mole %) | BTDA 100 | DSDA 100 | BTDA 100 | ODPA 100 | BTDA 90 PMDA 10 | DSDA 50 BTDA 50 | BTDA 100 | DSDA 100 |
| Diamine compound (mole %) | BAPS 90 (A) 10 | BAPS-M 90 (B) 10 | BAPP 80 (C) 20 | BAPB 80 (D) 20 | BAPS 70 PSX6 30 | BAPS-M 70 PSX6 30 | BAPS-M 80 PSX7 20 | BAPS-M 90 PSX7 10 |
| Hydroalkoxysilane[1] compound (mole %) | (2) 2 | (4) 3 | (6) 5 | (1) 2 | — | — | — | (1) 2 |
| Solvent | NMP | NMP | NMP | NMP | NMP | NMP | DMAc | NMP |
| viscosity (cps) | 5,000 | 7,000 | 4,000 | 5,500 | 3,500 | 4,500 | 4,000 | 5,000 |

TABLE 1-continued

| [Characteristics before curing[4]] | | | | | | | | |
|---|---|---|---|---|---|---|---|---|
| Elastic modulus[2] (kg/mm$^2$) | 235 | 255 | 200 | 220 | 200 | 165 | 183 | 255 |
| Strength[2] (kg/mm$^2$) | 18.4 | 17.5 | 17.2 | 15.8 | 14.1 | 12.8 | 18.2 | 19.0 |
| Elongation[2] (%) | 20.2 | 15.1 | 10.6 | 22.3 | 34.0 | 31.5 | 18.0 | 15.4 |
| Glass transition[3] temperature (°C.) | 225 | 195 | 202 | 237 | 225 | 240 | 265 | 235 |
| [Chemical resistance[5]] | | | | | | | | |
| Chloroform | ○ | ○ | ○ | ○ | Δ | x | x | x |
| Dichloromethane | ○ | ○ | ○ | ○ | Δ | x | x | Δ |
| Trichlene | ○ | ○ | ○ | ○ | Δ | x | Δ | Δ |
| Acetone | ○ | ○ | ○ | ○ | ○ | Δ | ○ | ○ |
| Methanol | ○ | ○ | ○ | ○ | ○ | ○ | ○ | ○ |
| DMF | ○ | ○ | ○ | ○ | Δ | x | x | x |
| NMP | ○ | ○ | ○ | ○ | x | x | x | x |
| [Characteristics after curing[6]] | | | | | | | | |
| Elastic modulus[2] (kg/mm$^2$) | 242 | 270 | 213 | 23.7 | — | — | — | — |
| Strength[2] (kg/mm$^2$) | 19.1 | 18.2 | 18.3 | 16.2 | — | — | — | — |
| Elongation[2] (%) | 18.0 | 14.0 | 10.2 | 20.5 | — | — | — | — |
| Glass transition[3] temperature (°C.) | 23.6 | 208 | 221 | 244 | — | — | — | — |

[1] mole % based on the vinyl group
[2] Tensile test (ASTM D-882-64-T)
[3] Thermal mechanical analysis (TMA)
[4] Measured values after forming films
[5] Evaluation after one hour since dipping films ○: insoluble, Δ: swollen, x: soluble
[6] Measured values after treating at 200° C. for one hour

INDUSTRIAL APPLICABILITY

The polyimide resin of the present invention can be used in the form of a film, powder or varnish. Since the polyimide resin according to the present invention has an alkylsilicate group on a polyimide side chain, the heat resistance and the chemical resistance can be heightened by a cross-linking reaction. There can be expected as the concrete uses thereof, wide applications such as heat resistant adhesive materials, epoxy resin modifiers, heat resistant paints, resins for composite materials, coating agents for electronic materials, adhesive films for printed boards and molding materials.

We claim:

1. A silicate group-containing polyimide having a repeated unit represented by the following Formula (1):

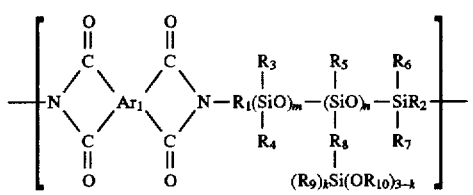

(1)

wherein $Ar_1$ represents a tetravalent organic group; $R_1$ and $R_2$ each are a single bond or represent an alkylene group having 1 to 4 carbon atoms or a phenylene group; $R_3$ to $R_7$, $R_9$ and $R_{10}$ each represent a hydrocarbon group having 1 to 6 carbon atoms; $R_8$ represents an ethylene group or an alkylene group having 3 to 6 carbon atoms; m and n represent independently an integer of 1 to 10; and k represents an integer of 0 to 2.

2. A silicate group-containing polyimide as described in claim 1, comprising 1 to 80 mole % of the repeated unit represented by Formula (1) and 20 to 99 mole % of a repeated unit represented by the following Formula (2):

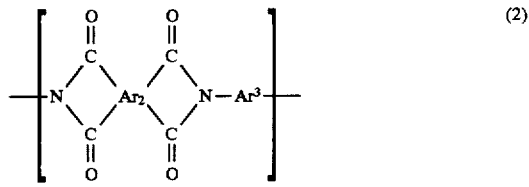

(2)

wherein $Ar_2$ represents a tetravalent organic group, and $Ar_3$ represents a divalent organic group having at least 3 aromatic rings.

3. A silicate group-containing polyimide as described in claim 1, wherein $Ar_1$ contained in the repeated unit represented by Formula (1) is represented by the following Formula (3):

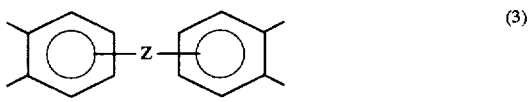

(3)

wherein Z is a single bond or represents —O—, —SO$_2$—, —C(CF$_3$)$_2$—, or —CO—.

* * * * *